Oct. 4, 1938. H. H. MILLER 2,132,079
TOOL CHECKING EQUIPMENT AND METHOD OF USING THE SAME
Filed April 5, 1937 3 Sheets-Sheet 1

Inventor
H.H. Miller
By [signature]
Attorneys.

Oct. 4, 1938.  H. H. MILLER  2,132,079
TOOL CHECKING EQUIPMENT AND METHOD OF USING THE SAME
Filed April 5, 1937  3 Sheets-Sheet 2

Inventor
H. H. Miller
By C. A. Snow & Co.
Attorneys

Oct. 4, 1938.  H. H. MILLER  2,132,079
TOOL CHECKING EQUIPMENT AND METHOD OF USING THE SAME
Filed April 5, 1937  3 Sheets-Sheet 3

Inventor
H. H. Miller
By C. A. Snow & Co.
Attorneys

Patented Oct. 4, 1938

2,132,079

UNITED STATES PATENT OFFICE 2,132,079

TOOL CHECKING EQUIPMENT AND METHOD OF USING THE SAME

Harry Harrison Miller, Charleston, W. Va.

Application April 5, 1937, Serial No. 135,126

1 Claim. (Cl. 40—19.5)

This invention relates to tool checking equipment and to a method of using the same.

An object of the invention is to provide efficient means for handling and lending tools whereby an accurate check can be kept upon all tools, etc., withdrawn from the tool room, thereby eliminating loss of tools, and also reducing, to the minimum, the time required to apply for and be supplied with the desired tools.

A still further object is to provide means by which a tool room attendant can quickly ascertain what tools are missing and by whom they were withdrawn.

A further object is to include means by which any withdrawn tool can be restored to the proper bin or other container without requiring any guess work on the part of the tool room attendant.

With the foregoing and other objects in view which will appear as the description proceeds, the invention consists of certain novel details of construction and combinations of parts and in certain steps of the method hereinafter more fully described and pointed out in the claim, it being understood that changes may be made in the construction and arrangement of parts and in the disclosed method without departing from the spirit of the invention as claimed.

In the accompanying drawings one form of equipment has been illustrated but it is to be understood that this equipment may be modified to suit different conditions under which it is used.

In said drawings

Figure 1:
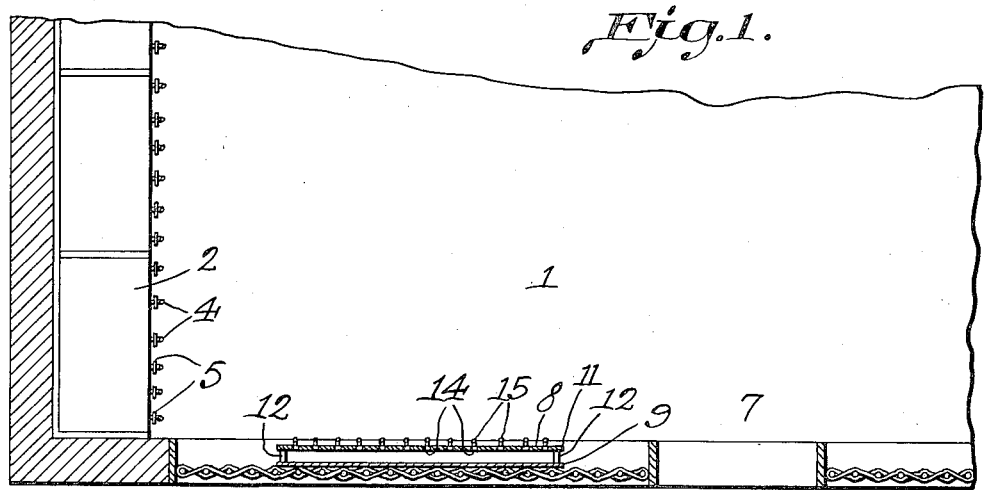
Figure 1 is a horizontal section through a portion of a tool room provided with the present equipment.
Figure 3:
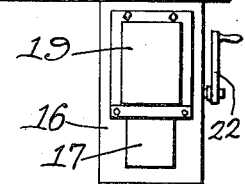
Figure 3 is a section on line 3—3, Figure 2.

In order that the present equipment may be utilized as an efficient means for keeping an accurate check upon tools and the like it is essential that there be used a control board, a means, such as a tool crib, for holding tools of different kinds and sizes, a means for supplying application slips or checks to the user, and an arrangement of identifying checks for cooperation with the control board and the crib to facilitate location of a withdrawn item. This equipment is to be set up within and adjacent to the usual tool room which has been indicated generally at 1 in Figure 1. Within this tool room are located cribs or other suitable containers for tools and the like to be withdrawn from time to time. One of these cribs has been indicated at 2 and, in the structure shown, is divided by vertical and horizontal partitions, into rows of separate compartments 3. Extending forwardly from the crib below each compartment 3 is a hook 4 for supporting a series of metal checks 5 each of which bears a number corresponding with the number of the compartment with which they are associated. One of these checks can be fastened to the front of the compartment as indicated at 6 so as not to be removable with the others. Thus it constitutes a means for identifying the compartment by number.

Figure 2:
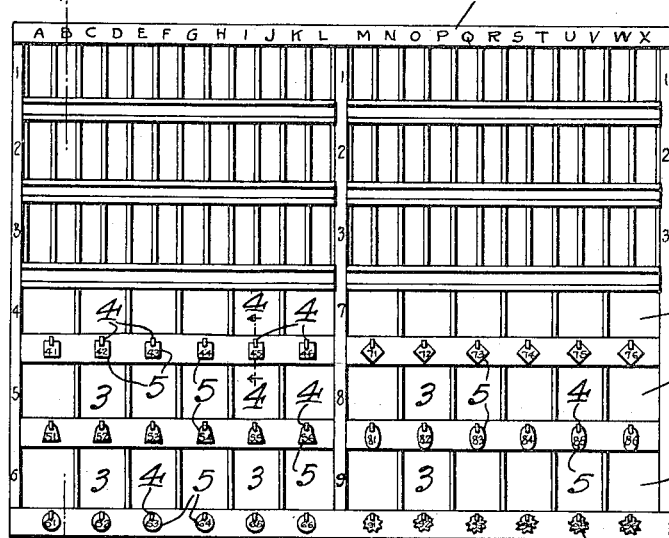
Figure 2 is an elevation of a tool crib which can form a part of the equipment.
Figures 4, 5:
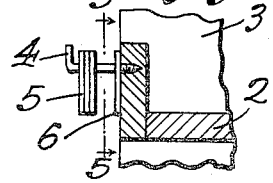
Figure 4 is an enlarged section on line 4—4, Figure 2.
Figure 5 is a section on line 5—5, Figure 4.

Long experience in the control of tools in production plants has disclosed the fact that approximately eighty-five percent of all the tools or equipment checked out of a tool room needs nothing more than a record of the person receiving the tool or other piece, in order to maintain a check on the withdrawal. The remaining fifteen percent of the miscellaneous tools, etc., comes within classifications that warrant a back check control in order that the person using these items can be located at any time. Within this fifteen percent are tools such as drilling machines and auxiliary devices, measuring devices, including all types of special gauges, micrometers, calipers, etc., special taps, dies, drills, or in other words all tools for which there might be a demand while it is in use. It has been found that this fifteen percent of tools can be divided into from three to five classifications and with this idea in mind the present method of checking tools and the like utilizes a check for each classification. Each check has a number representing the particular compartment 3 provided for the tool and the checks of each classification are of a design distinguishing them from the checks of each of the other classifications. Thus it will be noted, by referring to Figure 2, that square checks, bearing the compartment numbers, can be supported in front of the compartments containing tools or the like of one classification, substantially triangular checks can be supported in front of compartments containing tools of another classification, round checks can be arranged in front of compartments containing tools of a third classification, etc. In every instance the checks supported in front of each compartment bear the same identifying number as that appearing on that compartment.

It is not necessary to designate all compartments by checks. For example and as shown at the upper portion of Figure 2, additional compartments can be arranged in superposed rows and vertical columns, the columns being designated by letters or other characters while the superposed rows can be designated by numerals. Thus a tool or the like stored in compartment "D" in row "1" can be identified as "D—1".

Figure 6:
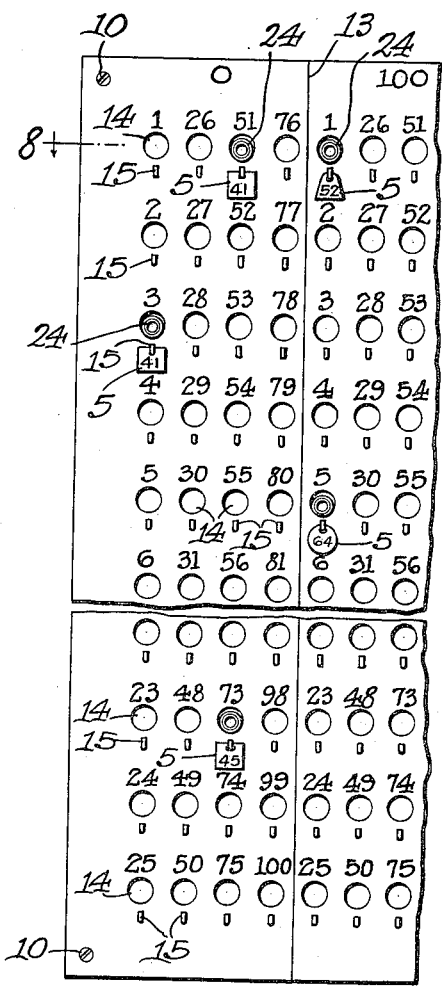
Figure 6 is a front elevation of one unit of the control board, parts being broken away.
Figure 7:
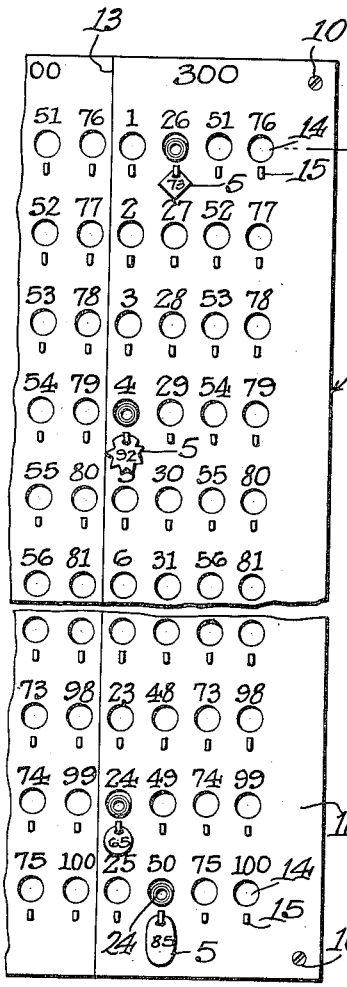
Figure 7 is a side elevation thereof.
Figure 8:
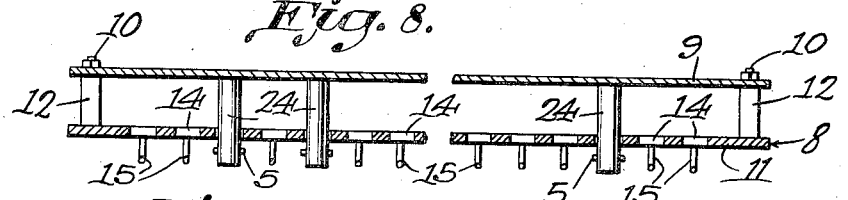
Figure 8 is a section on line 8—8, Figure 6.

A window 7 opens into the tool room 1 and at any suitable point in the tool room but preferably adjacent to this window, there is located a control board 8 which has been shown in detail in Figures 6, 7 and 8. While this control board can be of various constructions, according the requirements, the preferred form consists of a back plate 9 attached, as by means of bolts 10, to a front plate 11, there being any suitable means, such as spacing sleeve 12 on bolts 10, for holding the two plates properly spaced apart. This construction not only prevents accumulation of dust and dirt and ultimate clogging of the openings but also allows for the construction of a control board of any desired thickness, the thickness being varied by using spacing sleeves 24 longer or shorter than those illustrated. Thus the board is adapted for use with slips of different lengths when used therewith as hereinafter explained.

The front plate is preferably divided into four vertical columns by means of dividing lines 13 and in each of these columns can be located four vertical rows of circular openings 14, the openings in each row being uniformly spaced so that the corresponding openings in all of the rows will be arranged in horizontal alinement across the front plate. In practice it has been found desirable to use twenty-five openings in each vertical row so that each column thus contains one hundred openings. The openings in each vertical column are numbered consecutively from top to bottom and where four rows of twenty-five holes are used, the first row will be numbered from one to twenty-five, the second row from twenty-six to fifty, the third row from fifty-one to seventy-five, and the fourth row from seventy-six to one hundred. No heading need be provided for the first column but above the second column there is arranged the numeral "100" while the third and fourth columns are designated by the numerals "200" and "300" respectively. Thus any one of the four hundred holes contained within the front plate 11 can be located readily. Where more than four hundred holes are to be used in the equipment, another unit like that shown in Figure 6 can be placed beside the first unit and the columns thereon which will be the same as those shown in the illustrated unit, can be provided with designated headings such as "400", "500", "600" and "700". Thus the control board is flexible to adapt it to a production plant of any size.

Extending forwardly from the plate 11 below each of the openings 14 is a hook 15.

Suitably located outside of the tool room is a desk 16 for supporting a paper strip 17 as it is unwound from a roll 18 arranged within a housing 19. A presser roll 20 can bear downwardly on the strip 17 and pinch it against a feed roll 21 designed to be operated in any suitable manner, as by means of a crank arm 22 or the like. A tearing edge 23 can be located across the top of strip 17 where it emerges from the housing 19 and displayed on the desk at proper points adjacent to the path of the paper strip 17 are suitable captions such as "Man No.", "Name", "Tool wanted", and "Date". These captions are positioned where they will indicate to a person where the designated information is to be placed on the adjacent slip or strip of paper when pulled out onto the desk.

When a person desires to withdraw a tool he approaches the desk 16 and by rotating the roll 21, causes a length of paper to issue from the housing 19. The number of the workman, the date, the name of the workman and the tool or tools desired are then all written on this exposed portion of the paper strip after which it is torn off along the edge 23 and presented through the window 7 to the attendant within the tool room. The attendant, who is well acquainted with the positions of the various tools, promptly locates the desired article. As he withdraws each article from its compartment, he also removes one of the checks suspended in front of that compartment and which bears the distinctive number of the compartment. The requested tools are then presented to the workman after which the slip of paper is rolled into a small cylinder or cartridge as shown at 24 and inserted into the opening in the control board which is designated by the number of the particular person who has withdrawn the tools. For example if the number of the mechanic is "3", the rolled paper slip will be placed in opening 3. The attendant also hangs upon the hook beneath said opening the tags which he removed from in front of the compartments from which the tools were taken. If these tags are of different classifications, they will all be visible one in front of the other because of their different shapes.

After the tools have been taken away, there is always a record in the tool room whereby these tools can be located. For example let it be assumed that a request is made for a tool which is not located in its particular compartment. The tool room attendant looks over the control board for a tag corresponding in shape with the one belonging to the particular compartment from which the tool has been removed. When the proper check is found suspended on the control board, the attendant withdraws the paper slip from the opening thereabove and ascertains therefrom the name of the person who has the tool. This information can then be transmitted to the applicant.

Figure 11:
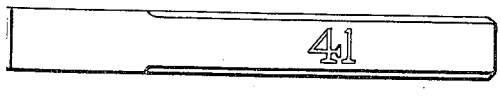
Figure 11 is an elevation of a tool and showing its identifying mark.
Figure 9:
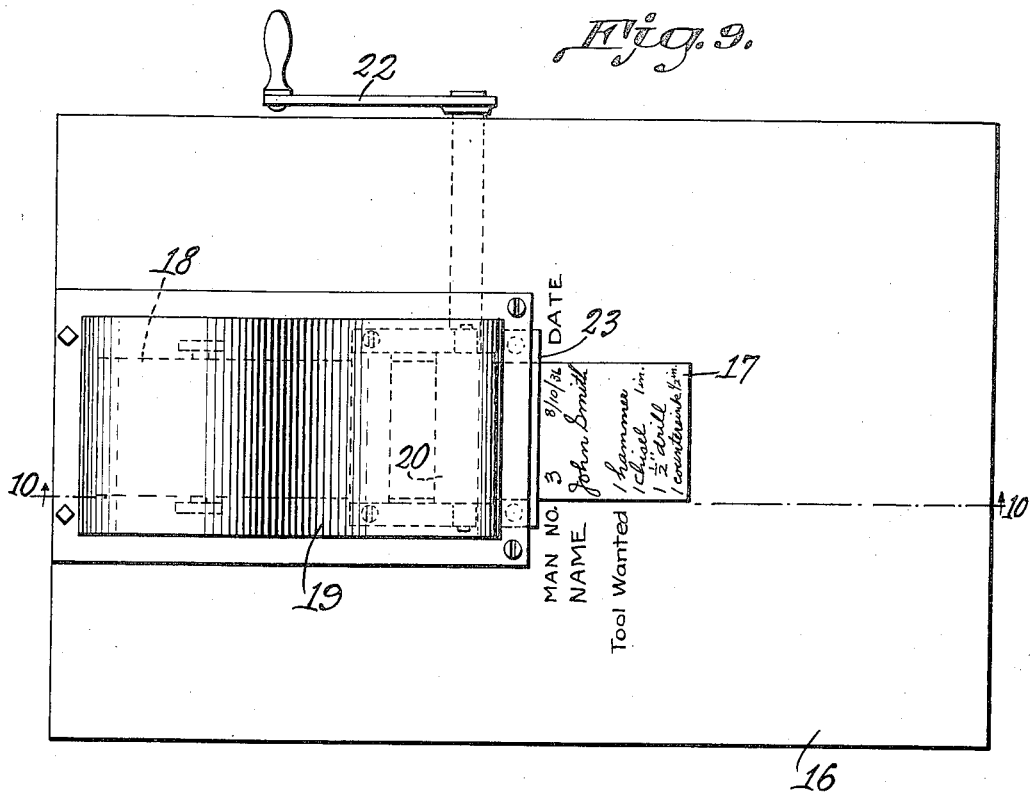
Figure 9 is a slip feeder shown in plan on an enlarged scale.
Figure 10:
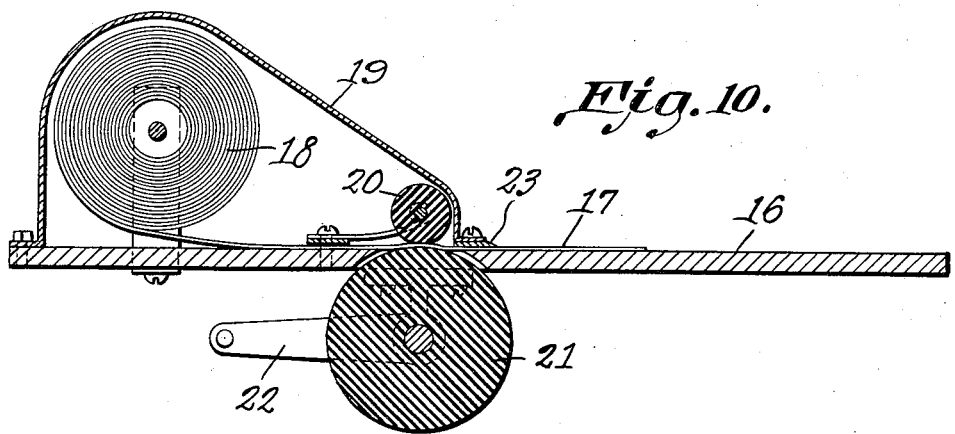
Figure 10 is a section on line 10—10, Figure 9.

At the end of the day each tool is turned in through the window 7 and in exchange therefor the slip identified by the number of the workman, is withdrawn from the opening 14 in which it is located and returned to the workman as his receipt, thus completing the transaction. The tool is then returned to its proper compartment and this can be determined readily because it is intended to etch or otherwise permanently display on each tool the compartment or bin number. A tool thus marked has been illustrated in Figure 11.

It is to be understood of course that when the slips are removed from the control board the checks are also removed and are returned to the hooks 4 from which they were removed. Thus after the last man has turned in the tools which had been withdrawn, an inspection of the control board will instantly disclose what workmen have not returned tools. This will be indicated by the slips remaining in the control board and the checks suspended thereunder. If the tools are not returned within a time limit which has been set, the names of the workmen will be posted adjacent to the desk 16 as a reminder and, should this notice fail to bring the desired results, notifications can be sent to foremen or others under whom the workmen are employed.

While it has been found desirable to employ checks of different shapes, it is to be understood that they can differ in color for the purpose of class identification.

What is claimed is:

In a tool checking equipment, a control board including a back plate, a front plate, spacing sleeves removably fastened between the plates, there being columns of designated apertures in the front plate, and means adjacent to each aperture for supporting a check.

HARRY HARRISON MILLER.